United States Patent
Herzberg

(10) Patent No.: US 12,495,471 B2
(45) Date of Patent: Dec. 9, 2025

(54) BUTANEDIONE SENSOR FOR MICROWAVE CONTROL

(71) Applicant: Honeywell Federal Manufacturing & Technologies, LLC, Kansas City, MO (US)

(72) Inventor: Michael Richard Herzberg, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 868 days.

(21) Appl. No.: 17/825,293

(22) Filed: May 26, 2022

(65) Prior Publication Data

US 2023/0389141 A1 Nov. 30, 2023

(51) Int. Cl.
*H05B 6/64* (2006.01)
*G01N 33/00* (2006.01)

(52) U.S. Cl.
CPC ....... *H05B 6/6458* (2013.01); *G01N 33/0063* (2013.01)

(58) Field of Classification Search
CPC .. G01N 33/0063; H05B 6/6447; H05B 6/645; H05B 6/6458; H05B 6/6485
USPC ........ 219/707, 708, 710, 711–712, 716, 725, 219/704, 702
See application file for complete search history.

(56) References Cited

U.S. PATENT DOCUMENTS

| | | | |
|---|---|---|---|
| 4,319,110 A | 3/1982 | Tanabe et al. | |
| 5,519,194 A * | 5/1996 | Gong | H05B 6/6458 219/703 |
| 2004/0135684 A1 | 7/2004 | Steinthal et al. | |
| 2016/0205973 A1 | 7/2016 | An et al. | |
| 2018/0195738 A1 * | 7/2018 | Park | F04D 29/701 |

FOREIGN PATENT DOCUMENTS

| | | | |
|---|---|---|---|
| CN | 106198787 | 3/2017 | |
| EP | 3137817 | 3/2017 | |
| JP | 2004219047 A * | 8/2004 | H05B 6/6458 |

* cited by examiner

Primary Examiner — Quang T Van
(74) Attorney, Agent, or Firm — Hovey Williams LLP

(57) ABSTRACT

A microwave oven for warming food, the microwave oven including an enclosure, a microwave generator, a chemical sensor, and a controller. The enclosure forms a heating chamber in which the food is warmed. The microwave generator is configured to propagate microwaves into the heating chamber to warm the food. The chemical sensor is in fluid communication with the heating chamber and configured to detect a chemical indicative of a completed warming state of the food and transmit a detection signal indicating the completed warming state has been achieved upon detection of the chemical. The controller is configured to generate an output alteration signal representing an instruction to alter an output of the microwave generator upon receiving the detection signal from the first sensor to minimize release of the chemical.

21 Claims, 3 Drawing Sheets

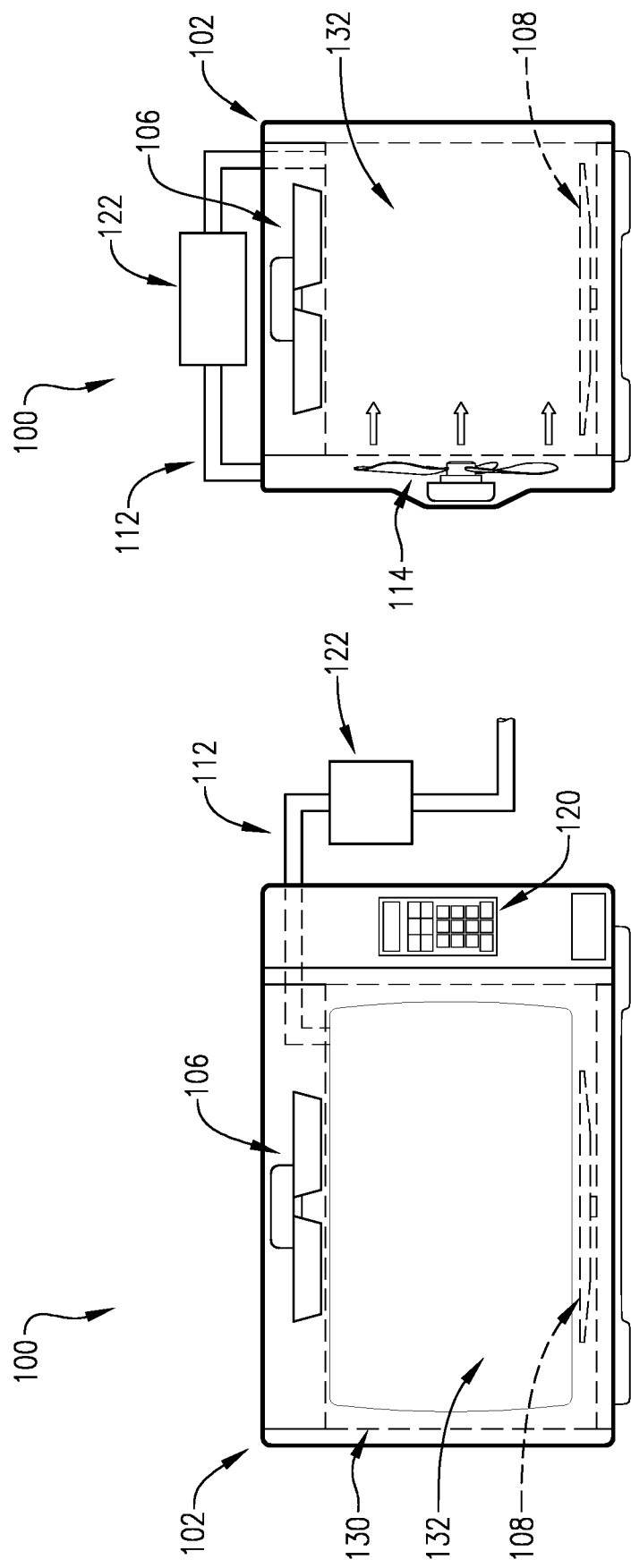

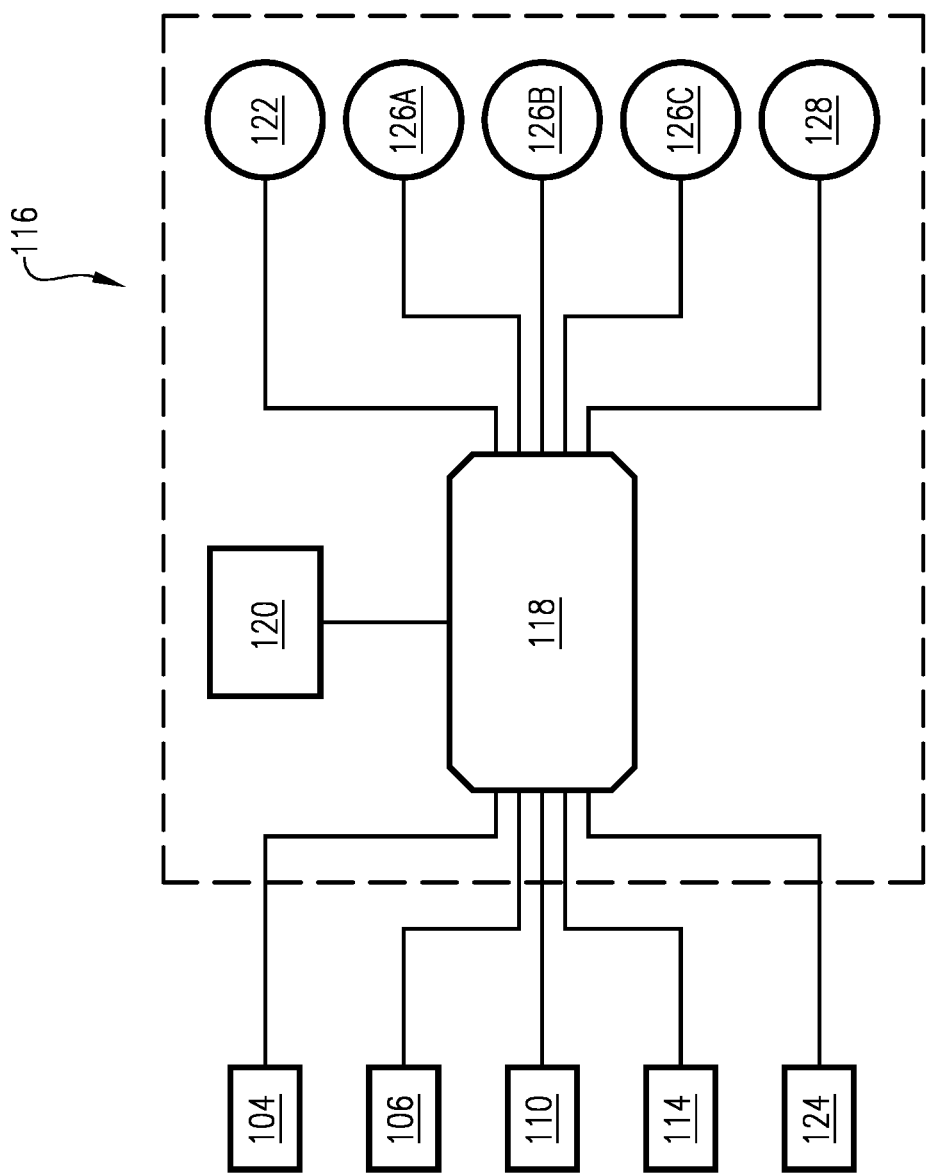

BUTANEDIONE SENSOR FOR MICROWAVE CONTROL

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

Microwave ovens often have food cooking options for actively terminating cooking sessions upon certain criteria being met. For example, a popcorn option may be selected for ending a popcorn popping session once a predetermined popping frequency has been reached. As another example, a re-heating option may be selected for ending a leftover cooking session once a predetermined humidity level has been reached. These cooking options are improvements over passively cooking for a selected amount of time in which food can be substantially overcooked if left un-attended, but they still often result in the release of undesirable odors.

SUMMARY

Embodiments of the invention solve the above-mentioned problems and other problems and provide a distinct advancement in the art of microwave ovens. More particularly, the invention provides a microwave oven that prevents the release of undesirable odors related to microwave cooking by detecting butanedione, diacetyl, volatile organic compounds, or other chemicals via the chemical sensor before they are detectable, noticeable, or unpleasant to humans.

An embodiment of the invention is a microwave oven broadly comprising an enclosure, a microwave generator, a beam mixer, a sample tube, a convection fan, and a control system including a controller, a control panel, a chemical sensor, a heating element, a number of temperature sensors, and a secondary sensor. The microwave oven may be used in a home kitchen or office breakroom setting where odors are particularly undesirable.

The enclosure forms a heating chamber configured to receive food to be warmed (i.e., heated, re-heated, thawed, cooked, etc.). The enclosure includes a metal paneling, skin, or coating to reflect microwaves in the heating chamber and prevent microwaves from emitting from the heating chamber. The enclosure may also be a metal mesh embedded in a microwave-transparent material, or a metal-loaded composite.

The microwave generator is configured to generate microwaves and propagate them into the heating chamber. The microwave generator includes a power supply, a transformer, a capacitor, a magnetron, an antenna, and the like. The microwave generator is configured to alter its output in terms of energy, power, wavelength, frequency, microwave pattern, microwave direction, and the like.

The beam mixer alters the microwaves to be suitable or improved for warming the food. The beam mixer includes or may work in conjunction with a wave guide and wave stirrer to effect resultant microwaves to be propagated into the heating chamber.

The sample tube forms a fluid channel fluidly connected to the heating chamber. In one embodiment, the sample tube may include a first end leading from the heating chamber and a second end leading to ambient air. Alternatively, the second end may lead back into the heating chamber. The microwave oven could also include multiple sample tubes, multiple inlets leading into the fluid channel where samples are taken, or non-sampling return air channels.

The convection fan is positioned near the first end or second end of the sample tube or between the first end and second end of the sample tube. The convection fan is configured to blow air through the fluid channel of the sample tube (i.e., a high pressure configuration) or draw air from the fluid channel (i.e., a low pressure configuration). A cooling fan for the microwave oven's magnetron or transformer could be used for this purpose, or separate fans may be dedicated for the sample tube and a convection or exhaust system of the microwave oven.

The controller may be a processor, logic board, or the like and is communicatively coupled with the control panel, the chemical sensor, the temperature sensors, the secondary sensor, and other components of the microwave oven to receive signals therefrom. The controller is also communicatively coupled with the microwave generator, beam mixer, convection fan, heating element, and other components to transmit command signals thereto. The controller may form control loops with several of these components.

The control panel is communicatively connected to the controller and may include start, stop, and reset buttons, a number pad for entering a heating duration, a power level toggle, a food type button (e.g., for toggling between meat, beverage, and snack), heating mode buttons (e.g., cook, defrost, reheat), and the like. The control panel may also include a number of quick-use presets such as popcorn, thirty-second reheat, and freeze-thaw.

The chemical sensor is positioned in the fluid channel of the sample tube, or if a sample tube is not used, the chemical sensor is positioned in the heating chamber. The chemical sensor is communicatively coupled to the controller and is a butanedione sensor, a diacetyl sensor, a volatile organic compound (VOC) sensor, or any other suitable sensor.

The heating element is positioned near the chemical sensor. The heating element may be a resistive heater, a convective heater, or the like. The heating element 124 is configured to warm the chemical sensor (directly or indirectly) to an operating temperature to improve operability or accuracy of the chemical sensor.

The temperature sensors are positioned upstream, near, and downstream of the chemical sensor to detect a temperature of the chemical sensor. The temperature sensors are communicatively coupled with the controller and configured to transmit temperature signals representative of the detected temperatures and transmit the temperature signals to the controller.

The secondary sensor may be positioned anywhere in the microwave oven (depending on its type) to detect a secondary characteristic of the food. The secondary sensor is communicatively coupled with the controller and configured to transmit a secondary signal indicating the secondary characteristic has been realized.

In use, food may be placed in the heating chamber and warming options may then be selected by a user via the control panel. For example, the user may select "high power" and "popcorn". The control panel then transmits user input signals representing these selections to the controller.

The temperature sensors then detect temperatures of the air in the channel of the sample tube and transmit temperature signals representing the detected temperatures to the controller. If the temperatures are too low for the chemical sensor to operate optimally, the controller may activate the heating element to warm the chemical sensor until the temperature detected by the temperature sensors is within a suitable range.

The user may then press "start" to begin microwaving the food. To that end, the control panel transmits a start signal to the controller, which in turn transmits an activation signal to the microwave generator. The microwave generator thereby generates microwaves and propagates them into the heating chamber to warm the food.

As the food is warmed, it may begin to release butanedione, diacetyl, volatile organic compounds, or other chemicals. The release or presence of such chemicals may be indicative of a completed warming state of the food. The chemical sensor may then detect the chemical before it becomes detectable, noticeable, or unpleasant to humans. The chemical sensor then generates a detection signal indicating the completed warming state has been achieved and transmits the detection signal to the controller.

The completed warming state may be a state in which the food has been warmed or cooked sufficiently as evidenced by the detection of the chemical. This may occur even if a preset or selected warming time has not elapsed. In other embodiments, the completed warming state may further require secondary characteristics of the food be realized such as the food being cooked to a threshold temperature or for a threshold amount of time. Alternatively, the secondary characteristic may be that a threshold pop frequency is achieved. Fulfilment of these further requirements may be detected by the secondary sensory. In that case, the secondary sensor transmits a secondary signal to the controller indicating the secondary characteristic has been realized.

The completed warming state could also represent a localized overheating condition requiring modification or modulation of the microwave signal. The secondary sensor may help classify the situation as described above. For example, a passive infrared sensor or an infrared camera in conjunction with a turntable may help differentiate between localized heating (and hence localized overheating) from completed warming.

The controller then generates an output alteration signal representing an instruction to alter an output of the microwave generator and transmits the output alteration signal to the microwave generator upon receiving the detection signal from the chemical sensor (and potentially the secondary signal from the secondary sensor) to minimize release of the chemical. The microwave generator then alters its output accordingly.

The above-described invention provides several advantages. For example, the microwave oven detects butanedione, diacetyl, volatile organic compounds, or other chemicals and prevents them from being released to a point of becoming unpleasant odors. The microwave oven also provides more control over food heating by establishing a control loop between its sensors and the controller. The microwave oven also provides more versatile heating responses depending on the type of food being warmed, the type of warming being done, user selected inputs, and other factors. Furthermore, the microwave oven improves sensor performance by heating certain sensors to an operable or optimal operating temperature.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a front elevation view of a microwave oven constructed in accordance with an embodiment of the invention;

FIG. 2 is a side elevation view of a microwave oven constructed in accordance with another embodiment of the invention;

FIG. 4 is a schematic diagram of certain components of the microwave oven of FIG. 1.

Figure 3:
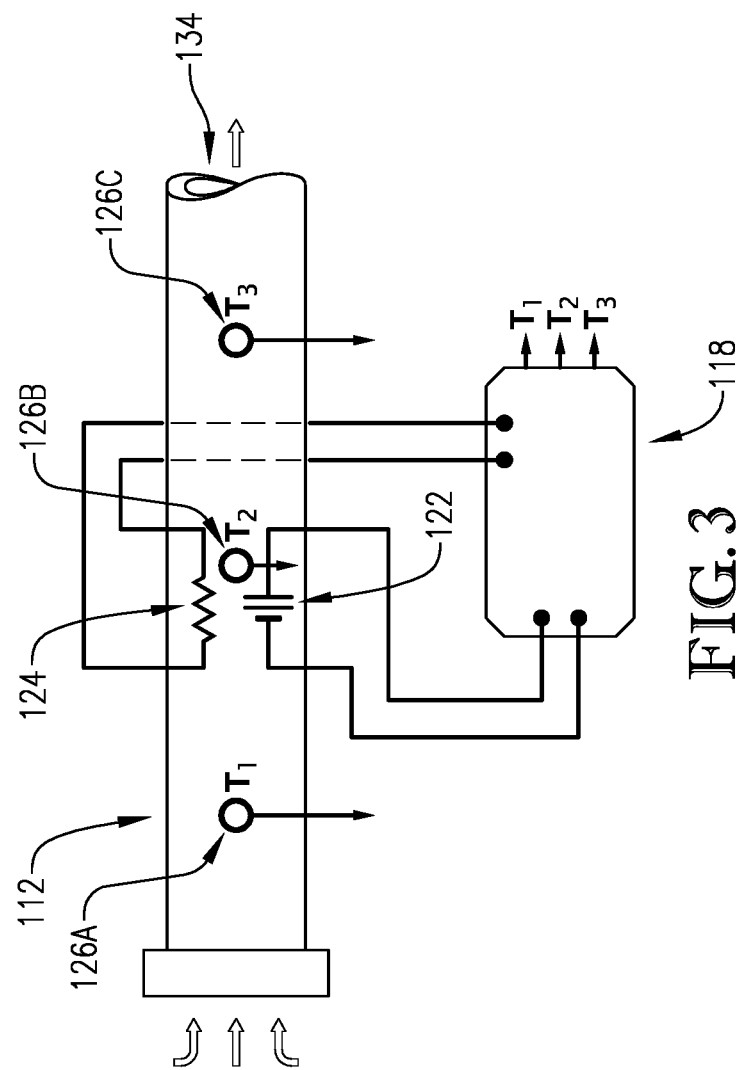
FIG. 3 is an enlarged elevation view of certain components of the microwave oven of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a microwave oven 100 constructed in accordance with an embodiment is illustrated. The microwave oven 100 broadly comprises an enclosure 102, a microwave generator 104, a beam mixer 106, a turntable 108, a turntable motor 110, a sample tube 112, a convection fan 114, and a control system 116 including a controller 118, a control panel 120, a chemical sensor 122, a heating element 124, a plurality of temperature sensors 126A-C, and a secondary sensor 128.

The enclosure 102 includes a door 130 and forms a heating chamber 132 accessible via the door 130. The heating chamber 132 is configured to receive food to be warmed (i.e., heated, re-heated, thawed, cooked, etc.). To that end, the turntable may be positioned in a bottom of the heating chamber 132. The enclosure 102 may include a metal paneling, skin, or coating to reflect microwaves in the heating chamber 132 and prevent microwaves from emitting from the heating chamber. The enclosure 102 may also be a metal mesh embedded in a microwave-transparent material, or a metal-loaded composite. This protects users and other components of the microwave oven 100 (e.g., the controller 118 and control panel 120) from the microwaves.

The microwave generator 104 is configured to generate microwaves and propagate them into the heating chamber 132. The microwave generator 104 may include a power supply, a transformer, a capacitor, a magnetron, an antenna, and the like. The microwave generator 104 may be configured to alter its output in terms of energy, power, wavelength, frequency, microwave pattern, microwave direction, and the like.

The beam mixer 106 alters the microwaves to be suitable or improved for warming the food. The beam mixer 106 may include or may work in conjunction with a wave guide and wave stirrer to effect resultant microwaves to be propagated into the heating chamber 132.

The turntable 108 supports the food in the heating chamber 132 and is drivably connected to the turn table motor 110 to rotate relative to the enclosure 102. The turntable 108 thus helps more evenly warm the food in the event an energy density of the microwaves in the heating chamber 132 is non-homogenous.

The turntable motor 110 is drivably connected to the turntable and communicatively coupled to the controller 118. The turntable 108 may be configured to start, stop, change direction, or change speed depending on a turntable signal received from the controller 118.

The sample tube 112 forms a fluid channel 134 fluidly connected to the heating chamber 132. In one embodiment, as shown in FIG. 1, the sample tube 112 may include a first end leading from the heating chamber 132 and a second end leading to ambient air. In this case, the sample tube 112 may include a filter near the second end to prevent chemicals from being released into the ambient air. Alternatively, as shown in FIG. 2, the second end may lead back into the heating chamber 132. The sample tube 112 or the enclosure 102 may also include a component or chemical supply configured to neutralize butanedione, diacetyl, volatile organic compounds, or other chemicals. This component or chemical supply may be passively present or may be configured to be activated or released upon detection of the chemical or chemicals to be neutralized. The microwave oven 100 could also include multiple sample tubes, multiple inlets leading into the fluid channel where samples are taken, or non-sampling return air channels.

The convection fan 114 may be positioned near the first end or second end of the sample tube or between the first end and second end. The convection fan 114 is configured to blow air through the fluid channel 134 of the sample tube 112 (i.e., a high pressure configuration) or draw air from the fluid channel 134 (i.e., a low pressure configuration). A cooling fan for the microwave oven's magnetron or transformer could be used for this purpose, or separate fans may be dedicated for the sample tube 112 and a convection or exhaust system of the microwave oven 100. It may be desirable for air in the fluid channel 134 to be turbulent at least near the chemical sensor 122 for more accurate or more consistent sensing. Turbulence may also prevent hot or cold regions in the fluid channel 134 for more accurate or more consistent temperature sensing. The convection fan 114 may be particularly suitable for ensuring the air in the fluid channel 134 is turbulent.

The sample tube 112 and chemical sensor 122 are shown in FIGS. 1 and 2 outside the enclosure 102, but they may also be positioned within the enclosure 102 (albeit outside the heating chamber 132 in most instances). For example, the sample tube 112 and chemical sensor 122 may be positioned behind the control panel 120. This could leverage an existing exhaust path or existing waste heat from the microwave's transformer to warm the chemical sensor 122. Alternatively, the sample tube 112 and chemical sensor 122 may be positioned above the beam mixer 106. This may be advantageous in convection devices to leverage recirculating airflow to help detect odorous chemicals.

The controller 118 may be a processor, logic board, or the like and is communicatively coupled with the control panel 120, the chemical sensor 122, the temperature sensors 126A-C, the secondary sensor 128, and other components of the microwave oven 100 to receive signals therefrom. The controller 118 is also communicatively coupled with the microwave generator 104, beam mixer 106, turntable motor 110, convection fan 114, heating element 124, and other components to transmit command signals thereto. The controller 118 may form control loops with several of these components.

The controller 118 may implement aspects of the present invention with one or more computer programs stored in or on computer-readable medium residing on or accessible by the processor. Each computer program preferably comprises an ordered listing of executable instructions for implementing logical functions in the controller 118. Each computer program can be embodied in any non-transitory computer-readable medium, such as the memory described below, for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The control panel 120 is communicatively connected to the controller 118 and may include a plurality of buttons, switches, dials, and other inputs. For example, the control panel 120 may include start, stop, and reset buttons, a number pad for entering a heating duration, a power level toggle, a food type button (e.g., for toggling between meat, beverage, and snack), heating mode buttons (e.g., cook, defrost, reheat), and the like. The control panel may also include a number of quick-use presets such as popcorn, thirty-second reheat, and freeze-thaw.

The chemical sensor 122 may be positioned in the fluid channel 134 of the sample tube 112, or if a sample tube is not used, the chemical sensor 122 may be positioned in the heating chamber 132. In either case, the chemical sensor 122 may be positioned near a fluid highpoint for improved sensing. The chemical sensor 122 is communicatively coupled to the controller 118 and may be a butanedione sensor, a diacetyl sensor, a volatile organic compound (VOC) sensor, or any other suitable sensor. The chemical sensor 122 may be configured to detect a chemical indicative of a completed warming state of the food and transmit a detection signal indicating the completed warming state has been achieved upon detection of the chemical.

The heating element 124 may be positioned near the chemical sensor 122 whether in the fluid channel 134 or in the heating chamber 132. The heating element may be a resistive heater, a convective heater, or the like. The heating element 124 may be configured to warm the chemical sensor 122 or air encountering the chemical sensor 122 to an operating temperature to improve operability or accuracy of the chemical sensor 122.

The temperature sensors 126A-C may be positioned upstream, near, and downstream of the chemical sensor 122 (if in the fluid channel 134) or in positions near the chemical sensor 122 to detect a temperature in relation to the chemical sensor 122 as heated by the heating element 124. For example, the first temperature sensor 126A may be positioned upstream of the chemical sensor 122 to detect a temperature of the air passing through the channel 134 before being heated by the heating element 124, the second temperature sensor 126B may be positioned near the chemical sensor 122 to detect a temperature of the air near the heating element 124 and/or the chemical sensor 122, and the third temperature sensor 126C may be positioned downstream of the chemical sensor 122 to detect a temperature of the air after being heated by the heating element. The temperature sensors 126A-C may be communicatively coupled with the controller 118 and configured to generate temperature signals representative of the detected temperatures and transmit the temperature signals to the controller 118.

The secondary sensor 128 is communicatively coupled with the controller 118 and may be configured to detect a secondary characteristic of the food and transmit a secondary signal indicating the secondary characteristic has been realized. For example, the secondary sensor 128 may be configured to detect a temperature of the food, a humidity of air in the heating chamber 132, a pop frequency, a pop count, a temperature of the food or air in the heating chamber 132, an elapsed cooking time, or the like. The secondary sensor 128 may be a chemical sensor (similar to chemical sensor 122), an air humidity sensor, a non-contact sensor, a smoke or particle detector, an infrared camera or passive infrared sensor, a non-contact thermometer, a microphone, a vibration accelerometer, a scale or weight sensor, a structured light volume measurement sensor or 3D scanner, an air pressure volume measurement sensor, a moisture content meter (which might require a bowl or additional accessory), or an other suitable sensor.

Use of the microwave oven 100 will now be described in more detail. First, the food to be warmed may be placed in the heating chamber 132. Warming options may then be selected by the user via the control panel 120. For example, the user may select "high power" and "popcorn". The control panel 120 may then transmit user input signals representing these selections to the controller 118.

The temperature sensors 126A-C may then detect temperatures of the air in the channel 134 of the sample tube 112 and transmit temperature signals representing the detected temperatures to the controller 118. The controller 118 may then determine the temperatures are too low for the chemical sensor 122 to operate optimally. The controller 118 may then generate a heating signal and transmit the heating signal to the heating element 124 to activate the heating element 124.

The heating element 124 may thus warm the air near the chemical sensor 122 (or may warm the chemical sensor directly) until the temperature detected by the temperature sensors 126A-C is within a suitable range. This heating may be done before or during microwaving.

The user may then press "start" to begin microwaving the food. To that end, the control panel 120 may transmit a start signal to the controller 118, which may in turn generate an activation signal and transmit the activation signal to the microwave generator 104. In response to the activation signal, the microwave generator 104 may generate microwaves and propagate them into the heating chamber 132 to warm the food. The convection fan 114 may also be activated to circulate air form the heating chamber 132 through the channel 134 of the sample tube 112.

As the food is warmed, it may begin to release butanedione, diacetyl, volatile organic compounds, or other chemicals. The release or presence of such chemicals may be indicative of a completed warming state of the food. These chemicals may be circulated through the channel 134 of the sample tube 112 via the convection fan 114. The chemical sensor 122 may then detect the chemical. Importantly, the chemical sensor 122 detects the chemical before it becomes detectable, noticeable, or unpleasant to humans. The chemical sensor 122 may then generate a detection signal indicating the completed warming state has been achieved and transmit the detection signal to the controller 118.

The completed warming state may be a state in which the food has been warmed or cooked sufficiently as evidenced by the detection of the chemical. This may occur even if a preset or selected warming time has not elapsed. In other embodiments, the completed warming state may further require secondary characteristics of the food be realized such as the food being cooked to a threshold temperature or for a threshold amount of time. Alternatively, the secondary characteristic may be that a threshold pop frequency is achieved. Fulfilment of these further requirements may be detected by the secondary sensor 128. To that end, the secondary sensor 128 may transmit a secondary signal to the controller 118 indicating the secondary characteristic has been realized.

The completed warming state could also represent a localized overheating condition requiring modification or modulation of the microwave signal. The secondary sensor 128 may help classify the situation as described above. For example, a passive infrared sensor or an infrared camera in conjunction with a turntable may help differentiate between localized heating (and hence localized overheating) from completed warming.

The controller 118 may then generate an output alteration signal representing an instruction to alter an output of the microwave generator 104 and transmit the output alteration signal to the microwave generator 104 upon receiving the detection signal from the chemical sensor 122 to minimize release of the chemical. The microwave generator 104 may then alter its output accordingly. For example, the microwave generator 104 may deactivate, reduce its energy/power output, change a wavelength, frequency, or wave propagation pattern, of the microwaves, or the like.

The output alteration signal may be influenced by the secondary signal, the user input signals, or other factors. For example, the output alteration signal may represent an instruction to reduce an energy output if the secondary characteristic has not been realized and may represent an instruction to deactivate if the secondary characteristic has been realized. In this way, the microwave oven 100 may respond to the detection of the chemical differently depending on various conditions. The microwave oven 100 may also initially respond in a particular manner, then progress to other responses as conditions change. For example, the microwave generator 104 may reduce energy output upon detection of the chemical, then once a pop frequency threshold has been met, the microwave oven 100 may then deactivate.

The output alteration signal may alternatively be a scatter signal representing an instruction to change a scatter pattern of the microwaves. The scatter signal may not be directed at the microwave generator 104 per se, but instead may be directed to the beam mixer 106 or a microwave scatter mechanism. The controller 118 may also generate a turntable signal representing an instruction to change a movement of the turntable 108 and transmit the turntable signal to the turntable motor 110. This change in scatter pattern or in turntable movement may slow heating of the food or eliminate a hotspot that is causing the release of the chemical.

The controller 118 could also provide user feedback via a display screen or by sending a message to another electronic device to notify a user of a change in microwave output or breaches of more serious triggers. This could allow the user to bypass decisions of the controller 118.

For good popcorn cooking performance, a volume sensor or 3D scanner could be paired with a chemical sensor. A popcorn bag could thereby be observed to expand, which indicates an approaching completed warming state. Meanwhile, the controller 118 may set baseline levels for the chemical sensor to help separate proper cooking from burning.

The above-described invention provides several advantages. For example, the microwave oven 100 detects butanedione, diacetyl, volatile organic compounds, or other chemicals and prevents them from being released to a point of becoming unpleasant odors. The microwave oven 100 also provides more control over food heating by establishing a control loop between its sensors and the controller 118. The microwave oven also provides more versatile heating responses depending on the type of food being warmed, the type of warming being done, user selected inputs, and other factors. Furthermore, the microwave oven 100 improves sensor performance by heating certain sensors to an operable or optimal operating temperature.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A microwave oven for warming food, the microwave oven comprising:
    an enclosure forming a heating chamber for receiving the food;
    a microwave generator configured to propagate microwaves into the heating chamber to warm the food;
    a first sensor in fluid communication with the heating chamber and configured to detect a chemical indicative of a completed warming state of the food and transmit a detection signal indicating the completed warming state has been achieved upon detection of the chemical;
    a second sensor configured to detect a secondary characteristic of the food and transmit a secondary signal indicating the secondary characteristic has been realized; and
    a controller configured to generate an output alteration signal representing an instruction to alter an output of the microwave generator in a first manner upon receiving the detection signal from the first sensor and not receiving the secondary signal from the second sensor for minimizing release of the chemical and to alter an output of the microwave generator in a second manner different from the first manner upon receiving the detection signal from the first sensor and receiving the secondary signal from the second sensor.

2. The microwave oven of claim 1, the chemical being at least one of butanedione, diacetyl, and a volatile organic compound.

3. The microwave oven of claim 1, the second manner being to deactivate the microwave generator.

4. The microwave oven of claim 1, the output being an energy output, the first manner being to reduce the energy output of the microwave generator.

5. The microwave oven of claim 1, the secondary characteristic being at least one of humidity, a pop frequency, a pop count, a temperature, and an elapsed cooking time.

6. The microwave oven of claim 1, further comprising a sample tube forming a channel and including a first end leading from the heating chamber, the first sensor being configured to sample exhaust gas passing from the heating chamber through the channel.

7. The microwave oven of claim 6, the sample tube further including a second end opposite the first end, the microwave oven further comprising a filter attached near the second end of the sample tube.

8. The microwave oven of claim 6, the sample tube further including a second end opposite the first end, the second end leading back to the heating chamber.

9. The microwave oven of claim 8, further comprising a convection fan connected between the second end of the sample tube and the heating chamber for circulating air through the sample tube.

10. The microwave oven of claim 6, further comprising a heating element configured to heat at least one of the first sensor and air near the first sensor to warm up the first sensor.

11. The microwave oven of claim 10, further comprising a plurality of temperature sensors configured to detect a temperature in the sample tube, the controller being further configured to adjust an output of the heating element based on the detected temperature.

12. The microwave oven of claim 6, the sample tube being configured so that air flowing over the first sensor is turbulent.

13. The microwave oven of claim 1, the first sensor being positioned near a fluid highpoint for improved sensing.

14. The microwave oven of claim 1, the controller being further configured to generate a scatter signal representing an instruction to change a scatter pattern of the microwaves.

15. The microwave oven of claim 1, the microwave oven further comprising a turntable motor and a turntable drivably connected to the turntable motor, the controller being further configured to generate a turntable signal representing an instruction to change a movement of the turntable.

16. A microwave oven for warming food, the microwave oven comprising:
    an enclosure forming a heating chamber for receiving the food;
    a microwave generator configured to propagate microwaves into the heating chamber to warm the food;
    a first sensor in fluid communication with the heating chamber and configured to detect a chemical indicative of a completed warming state of the food and transmit a detection signal indicating the completed warming state has been achieved upon detection of the chemical; and a controller configured to receive a user input signal representing a user input prior to microwave propagation by the microwave generator and to generate an output alteration signal representing an instruction to alter an output of the microwave generator upon receiving the detection signal from the first sensor for minimizing release of the chemical, the controller being further configured to generate a scatter signal representing an instruction to change a scatter pattern of the microwaves.

17. The microwave oven of claim 16, the user input being a food type.

18. The microwave oven of claim 16, the user input being a power setting.

19. A microwave oven for warming food, the microwave oven comprising:

an enclosure forming a heating chamber for receiving the food;

a microwave generator configured to propagate microwaves into the heating chamber to warm the food;

a first sensor in fluid communication with the heating chamber and configured to detect a chemical indicative of a completed warming state of the food and transmit a detection signal indicating the completed warming state has been achieved upon detection of the chemical;

a second sensor configured to detect a secondary characteristic of the food and transmit a secondary signal indicating the secondary characteristic has been realized; and a controller configured to receive a signal representing a user input prior to microwave propagation by the microwave generator and to generate an output alteration signal representing an instruction to alter an output of the microwave generator in a first manner upon receiving the detection signal from the first sensor and not receiving the secondary signal from the second sensor for minimizing release of the chemical and to alter an output of the microwave generator in a second manner different from the first manner upon receiving the detection signal from the first sensor and receiving the secondary signal from the second sensor.

20. A microwave oven for warming food, the microwave oven comprising:

an enclosure forming a heating chamber for receiving the food;

a microwave generator configured to propagate microwaves into the heating chamber to warm the food;

a first sensor in fluid communication with the heating chamber and configured to detect a chemical indicative of a completed warming state of the food and transmit a detection signal indicating the completed warming state has been achieved upon detection of the chemical;

a controller configured to generate an output alteration signal representing an instruction to alter an output of the microwave generator upon receiving the detection signal from the first sensor to minimize release of the chemical;

a sample tube forming a channel and including a first end leading from the heating chamber and a second end opposite the first end, the first sensor being configured to sample exhaust gas passing from the heating chamber through the channel; and a filter attached near the second end of the sample tube.

21. A microwave oven for warming food, the microwave oven comprising:

an enclosure forming a heating chamber for receiving the food;

a microwave generator configured to propagate microwaves into the heating chamber to warm the food;

a first sensor in fluid communication with the heating chamber and configured to detect a chemical indicative of a completed warming state of the food and transmit a detection signal indicating the completed warming state has been achieved upon detection of the chemical; and a controller configured to generate an output alteration signal representing an instruction to alter an output of the microwave generator upon receiving the detection signal from the first sensor to minimize release of the chemical, the controller being further configured to generate a scatter signal representing an instruction to change a scatter pattern of the microwaves.

* * * * *